US008472902B2

(12) United States Patent
Konno

(10) Patent No.: US 8,472,902 B2
(45) Date of Patent: Jun. 25, 2013

(54) RADIO BROADCAST RECEIVING APPARATUS AND RADIO BROADCAST RECEIVING METHOD

(75) Inventor: Ryo Konno, Saitama (JP)

(73) Assignee: Sony Corporation, Tokyo (JP)

( * ) Notice: Subject to any disclaimer, the term of this patent is extended or adjusted under 35 U.S.C. 154(b) by 409 days.

(21) Appl. No.: 12/486,321

(22) Filed: Jun. 17, 2009

(65) Prior Publication Data

US 2009/0325522 A1 Dec. 31, 2009

(30) Foreign Application Priority Data

Jun. 26, 2008 (JP) ................................ 2008-167489

(51) Int. Cl.
*H04B 1/18* (2006.01)

(52) U.S. Cl.
USPC ..... 455/185.1; 455/318; 455/566; 455/154.2; 348/563; 348/465

(58) Field of Classification Search
USPC ............. 455/318, 150.1, 154.2, 179.1, 185.1, 455/186.1, 184.1, 158.4, 566; 348/563, 465
See application file for complete search history.

(56) References Cited

U.S. PATENT DOCUMENTS

| | | | | |
|---|---|---|---|---|
| 6,611,678 | B1 * | 8/2003 | Zweig et al. | 455/161.3 |
| 6,854,127 | B1 * | 2/2005 | Kanemitsu | 725/58 |
| 7,545,440 | B2 * | 6/2009 | Kim et al. | 348/563 |
| 2002/0126219 | A1 * | 9/2002 | Kim et al. | 348/473 |
| 2004/0252604 | A1 * | 12/2004 | Johnson et al. | 369/47.22 |
| 2004/0266493 | A1 * | 12/2004 | Bahl et al. | 455/574 |
| 2006/0062363 | A1 * | 3/2006 | Albrett | 379/101.01 |
| 2007/0256100 | A1 * | 11/2007 | Jeong | 725/40 |
| 2008/0233909 | A1 * | 9/2008 | Matsutani | 455/186.1 |
| 2012/0304226 | A1 * | 11/2012 | Park | 725/39 |

FOREIGN PATENT DOCUMENTS

| | | | |
|---|---|---|---|
| JP | 07-184136 | A | 7/1995 |
| JP | 11-196342 | A | 7/1999 |
| JP | 2001-196956 | A | 7/2001 |
| JP | 2002-142163 | A | 5/2002 |
| JP | 2002-369094 | A | 12/2002 |
| JP | 2003-298969 | A | 10/2003 |
| JP | 2006-262089 | A | 9/2006 |
| JP | 2007-142887 | A | 6/2007 |
| JP | 2007-166409 | A | 6/2007 |
| JP | 2007142887 | * | 6/2007 |
| JP | 2008-060960 | A | 3/2008 |
| WO | WO 2005/076506 | A1 | 8/2005 |

* cited by examiner

*Primary Examiner* — Edward Urban
*Assistant Examiner* — Rui Hu
(74) *Attorney, Agent, or Firm* — Wolf, Greenfield & Sacks, P.C.

(57) ABSTRACT

A radio broadcast receiving apparatus according to the present invention includes a reception unit for receiving a broadcast signal from a broadcast station of a predetermined frequency; a content information extracting unit for extracting content information related to a content the broadcast station is broadcasting from the broadcast signal being received by the reception unit and storing the content information in a storage unit; a frequency control unit for sequentially switching the frequency to be received by the reception unit; and an electronic program guide generating unit for generating an electronic program guide showing content information related to a content the broadcast station is currently broadcasting based on the content information stored in the storage unit.

12 Claims, 12 Drawing Sheets

FIG. 2

| | NAME OF MUSIC | ARTIST (DJ) | TITLE | GENRE | COMMENT |
|---|---|---|---|---|---|
| 118 SELECTED STATION | CHANNEL 1 | UTAYA HIKARU | Prisoner On Love | J-POP | Welcome to Channel 1 |
| 120 OTHER STATION INFORMATION | CHANNEL 2 | GYARO | YAMAYUKI | JAPANESE BALLAD | ACCEPTING REQUESTS |
| | CHANNEL 3 | KOFUKURO | KUBOMI | J-POP | THIS WEEK'S TOP 5 |
| | CHANNEL 4 | Mr.Adult | TABIDACHI NO KOE | J-POP | Welcome to Channel 4 |
| | CHANNEL 5 | C'z | EIEN NO MISAKI | ROCK | C'Z SCHEDULED TO APPEAR AS GUEST PERFORMER |
| | CHANNEL 6 | Daniel Powder | Good Day | FOREIGN MUSIC | FOREIGN MUSIC COUNT DOWN |

FIG. 8

| | | NAME OF MUSIC | ARTIST (DJ) | TITLE | GENRE | COMMENT |
|---|---|---|---|---|---|---|
| 118 | SELECTED STATION | CHANNEL 1 | UTAYA HIKARU | Prisoner On Love | J-POP | Welcome to Channel 1 |
| 120 | OTHER STATION INFORMATION | CHANNEL 2 | GYARO | YAMAYUKI | JAPANESE BALLAD | ACCEPTING REQUESTS |
| | | CHANNEL 3 | TUN-KAT | Keep my face | J-POP | THIS WEEK'S TOP 4 |
| | | CHANNEL 4 | Mr.Adult | TABIDACHI NO KOE | J-POP | Welcome to Channel 4 |
| | | CHANNEL 5 | CHRIS PEPSI | Rock Beat | TALK | C'Z APPEARING AS GUEST PERFORMER |
| | | CHANNEL 6 | Daniel Powder | Good Day | JAPANESE BALLAD | FOREIGN MUSIC COUNT DOWN |
| | | ... | ... | ... | ... | ... |

FIG. 12

| NAME OF MUSIC | ARTIST (DJ) | TITLE | GENRE | COMMENT |
|---|---|---|---|---|
| CHANNEL 1 | UTAYA HIKARU | Prisoner On Love | J-POP | Welcome to Channel 1 |

RADIO BROADCAST RECEIVING APPARATUS AND RADIO BROADCAST RECEIVING METHOD

BACKGROUND OF THE INVENTION

1. Field of the Invention

The present invention relates to a radio broadcast receiving apparatus and a radio broadcast receiving method.

2. Description of the Related Art

In digital radio broadcast, a broadcast station can transmit program information and the like in addition to audio data. For example, the broadcast station for broadcasting a music program can transmit text information such as name of artist, title, and genre of the music being broadcast. In analog broadcast such as RBDS (Radio Broadcast Data System) broadcast used in FM broadcast and the like as well, the text information can be simultaneously transmitted with the audio data.

A radio broadcast receiving apparatus for receiving the radio broadcast may have various functions based on the text information transmitted from the broadcast station. For example, the radio broadcast receiving apparatus can display information related to music such as name of artist, title and genre contained in the text information. The user is then able to visually recognize the information on the music currently being played. International Publication No. WO2005/076506 discloses a radio broadcast receiving apparatus which stores the music broadcast in the past and analyzes and displays the broadcasting frequency and the like thereof. The user is then able to recognize the music frequently broadcast in the past without actually listening to the broadcast.

SUMMARY OF THE INVENTION

However, only program information of the broadcast station the broadcast of which is currently being received can be displayed in the radio broadcast receiving apparatus of the related art. Furthermore, only the music broadcast in the past is displayed in the radio broadcast receiving apparatus described in International Publication No. WO2005/076506. In other words, the radio broadcast receiving apparatus of the related art may not provide the user with information related to the content currently being broadcast by another broadcast station. As a result, the user is not able to recognize what program or music another broadcast station is currently broadcasting unless the user actually switches the reception channel.

The present invention addresses the above-identified, and other issues associated with methods in related art and apparatuses, and it is desirable to provide a new and improved radio broadcast receiving apparatus and radio broadcast receiving method capable of generating a latest electronic program guide showing the content information related to the contents currently being broadcast by a plurality of receivable broadcast stations.

According to an embodiment of the present invention, there is provided a radio broadcast receiving apparatus including a reception unit for receiving a broadcast signal from a broadcast station of a predetermined frequency; a content information extracting unit for extracting content information related to a content the broadcast station is broadcasting from the broadcast signal being received by the reception unit and storing the content information in a storage unit; a frequency control unit for sequentially switching the frequency to be received by the reception unit; and an electronic program guide generating unit for generating an electronic program guide showing content information related to a content the broadcast station is currently broadcasting based on the content information stored in the storage unit.

According to such a configuration, the radio receiving apparatus can extract the content information related to the content each broadcast station is broadcasting, and store the content information in the storage unit. The reception unit of the radio receiving apparatus can receive the broadcast signal from the broadcast station of the frequency sequentially switched by the frequency control unit. Furthermore, the electronic program guide generation unit of the radio receiving apparatus can generate the electronic program guide including content information related to a content the broadcast station is currently broadcasting based on the content information of each broadcast station stored in the storage unit.

The reception unit may sequentially receive the broadcast signal from the broadcast station of the frequency switched by the frequency control unit when a system of the radio broadcast receiving apparatus is not activated, and receive the broadcast signal from one broadcast station specified by a user when the system is activated.

The frequency control unit may sequentially switch the frequency to be received by the reception unit only when the system is not activated.

The frequency control unit may switch the frequency to be received by the reception unit every time the content information extracting unit extracts the content information from the broadcast signal received by the reception unit.

The reception unit may include a first reception unit and a second reception unit, the first reception unit may receive the broadcast signal from one broadcast station specified by a user only when a system of the radio broadcast receiving apparatus is activated, and the second reception unit may sequentially receive the broadcast signal from the broadcast station of the frequency switched by the frequency control unit irrespective of the activation state of the system.

The frequency control unit may sequentially switch the frequency to be received by the second reception unit irrespective of the activation state of the system.

The frequency control unit may switch the frequency to be received by the second reception unit every time the content information extracting unit extracts the content information from the broadcast signal received by the second reception unit.

The content information extracting unit may skip storing of the extracted content information in the storage unit if the extracted content information of a given broadcast station is the same as the content information of the same broadcast station stored in the storage unit.

The content information extracting unit may update the content information of the same broadcast station stored in the storage unit to the extracted content information if the extracted content information of a given broadcast station differs from the content information of the same broadcast station stored in the storage unit.

The content information extracting unit may extract the content information based on text information in ID3 tag format contained in the broadcast signal received by the reception unit.

The content information may include information related to at least name of artist, title, and genre.

The radio broadcast receiving apparatus may further include a display unit for displaying the electronic program guide generated by the electronic program guide generating unit.

According to another embodiment of the present invention, there is provided a radio broadcast receiving method in a radio broadcast receiving apparatus, the method including the steps of: receiving a broadcast signal from a broadcast station of a predetermined frequency; extracting content information related to a content the broadcast station is broadcasting from the broadcast signal being received in the receiving step and storing the content information in a storage unit; controlling the frequency to be received by the receiving step by sequentially switching the frequency; and generating an electronic program guide showing content information related to a content the broadcast station is currently broadcasting based on the content information stored in the storage unit in the extracting step.

According to an embodiment of the present invention, a radio broadcast receiving apparatus capable of generating a latest electronic program guide showing content information related to the contents currently being broadcast by a plurality of receivable broadcast stations.

BRIEF DESCRIPTION OF THE DRAWINGS

FIG. 2 is an explanatory view showing a display example of an EPG of the radio broadcast receiving apparatus 100 according to the first embodiment;

FIG. 8 is an explanatory view showing a display example of an EPG of the radio broadcast receiving apparatus 200 according to the second embodiment;

FIG. 12 is an explanatory view showing a display example of content information of the typical radio broadcast receiving apparatus 10 of the related art.

DETAILED DESCRIPTION OF THE PREFERRED EMBODIMENTS

Figure 1:
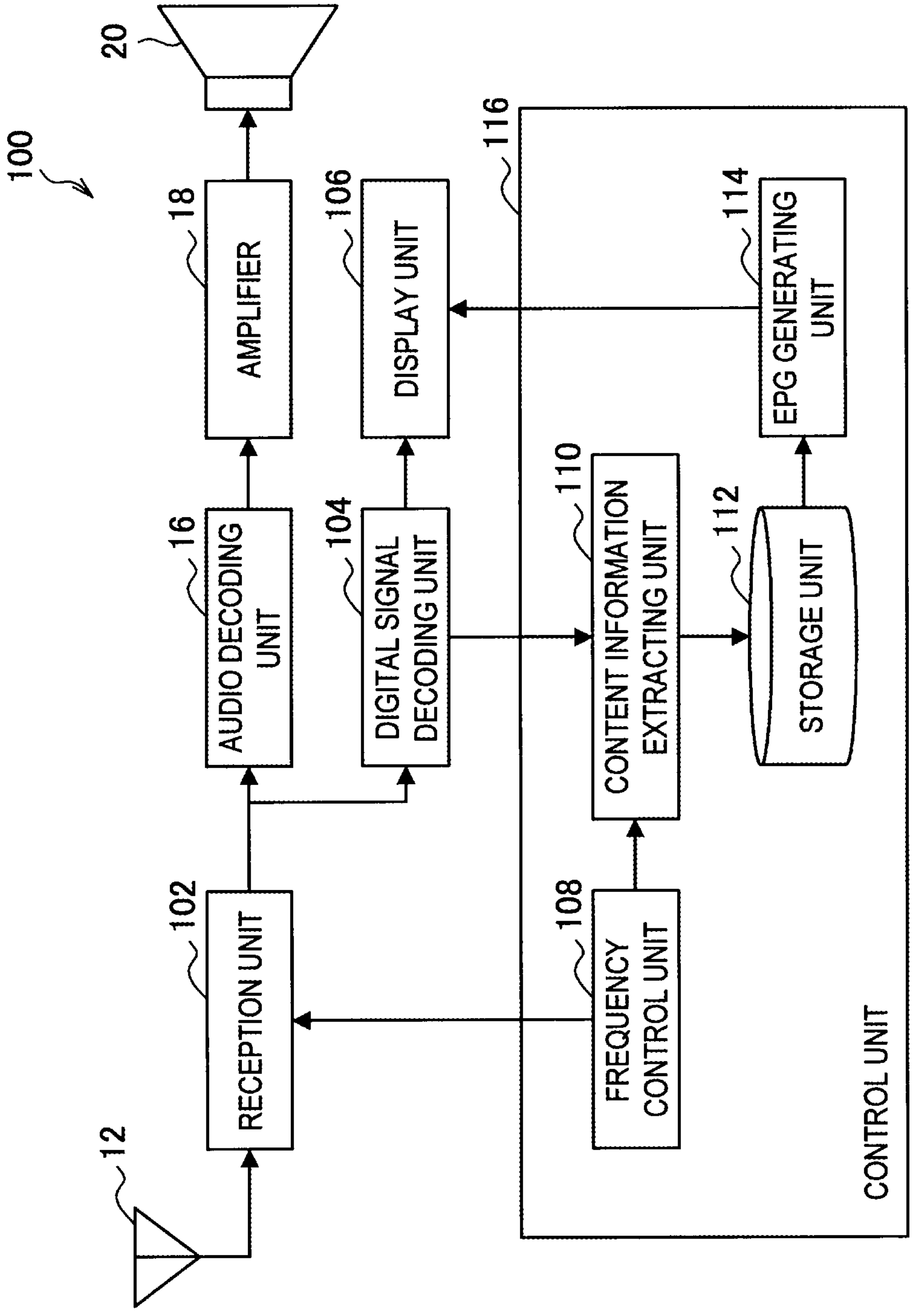
FIG. 1 is a function block diagram showing a functional configuration of a radio broadcast receiving apparatus 100 according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be hereinafter described in detail with reference to the accompanying drawings. In the present specification and the drawings, the same reference numerals are assigned to the components having substantially the same functional configuration to omit redundant explanation. The description will be made in the following order.

1. Radio broadcast receiving apparatus 10 of related art
2. First embodiment
2-1. Functional configuration of radio broadcast receiving apparatus 100
2-2. EPG generation flow
3. Second embodiment
3-1. Functional configuration of radio broadcast receiving apparatus 200
3-2. EPG generation flow (1. Radio Broadcast Receiving Apparatus 10 of Related Art)

Figure 10:
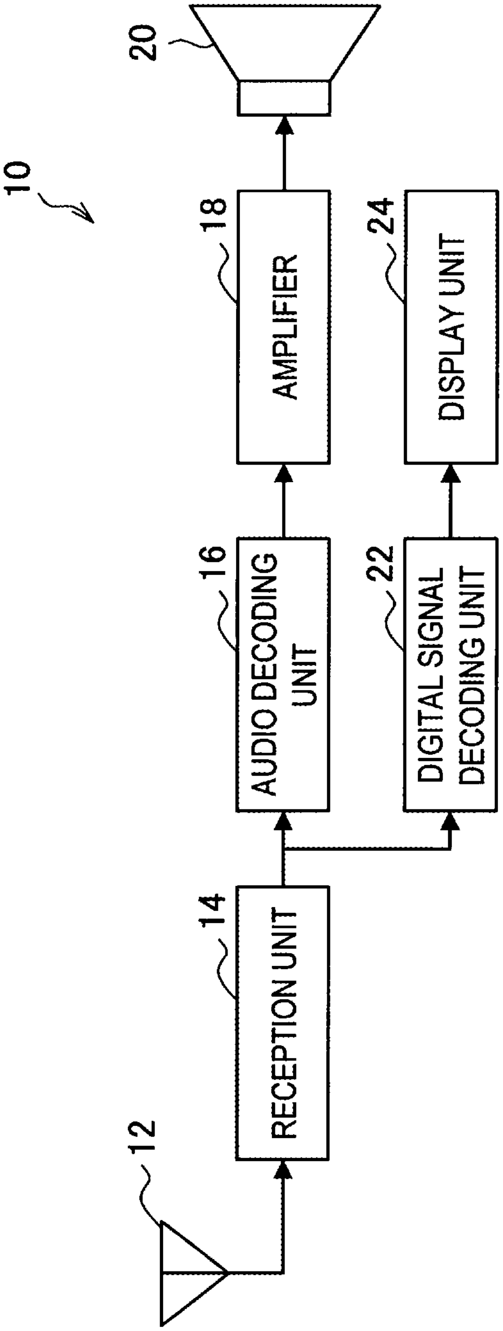
FIG. 10 is a function block diagram showing a functional configuration of a typical radio broadcast receiving apparatus 10 of the related art.

In order to clarify the features of the radio broadcast receiving apparatus according to the embodiments of the present invention, the radio broadcast receiving apparatus 10 of the related art will be described first. FIG. 10 is an explanatory view showing a functional configuration of a typical radio broadcast receiving apparatus 10 of the related art.

As shown in FIG. 10, the radio broadcast receiving apparatus 10 of the related art is configured to mainly include an antenna 12, a reception unit 14, an audio decoding unit 16, an amplifier 18, an audio output unit 20, a digital signal decoding unit 22, and a display unit 24. The components configuring the radio broadcast receiving apparatus 10 of the related art are connected by a bus (not shown), and controlled by a CPU (Central Processing Unit) (not shown). The components of the radio broadcast receiving apparatus 10 of the related art will be described below.

The antenna 12 receives broadcast signals from a plurality of radio broadcast stations. The antenna 12 can receive a broadcast signal of a frequency receivable by the radio broadcast receiving apparatus 10. The reception unit 14 detects a frequency signal of a predetermined broadcast station out of the broadcast signals received at the antenna 12. The reception unit 14 can detect the broadcast signal of a frequency specified by a user through an operation input unit (not shown), and the like. The reception unit 14 can also detect the broadcast signal of a frequency corresponding to, for example, a broadcast station set by the user in advance. The broadcast signal detected by the reception unit 14 is then transferred to the audio decoding unit 16 and the digital signal decoding unit 22.

The audio signal decoding unit 16 decodes audio data in the broadcast signal transferred from the reception unit 14. The audio data decoded by the audio signal decoding unit 16 is thereafter transferred to the amplifier 18.

The amplifier 18 amplifies the signal of the audio data decoded by the audio decoding unit 16. The amplifier 18 can optionally amplify the audio data signal according to instruction from the user, automatic setting of the radio broadcast receiving apparatus 10, or the like. The audio data amplified by the amplifier 18 is thereafter output as audio sounds through the audio output unit 20.

The digital signal decoding unit 22 decodes text information contained in the broadcast signal transferred from the reception unit 14. For example, in the digital radio broadcast, the broadcast station can transmit content information related to the content being broadcast and the like as text information in addition to audio data. For example, the broadcast station broadcasting a music program may transmit text information such as name of artist, title, and genre of the music being broadcast in addition to the music signal. The text information is transmitted in the form in ID3 tag or the like.

Figure 11:
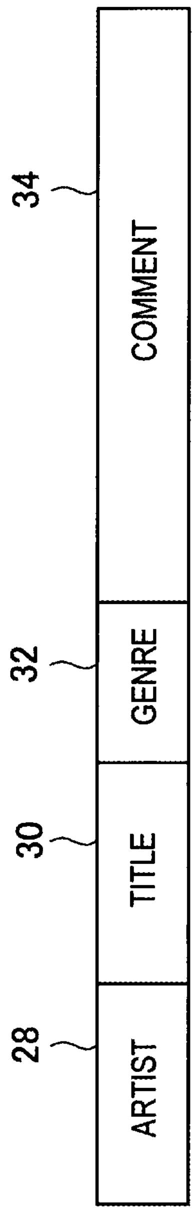
FIG. 11 is a conceptual view of text information in ID3 tag format.

FIG. 11 is a conceptual view showing one example of text information in ID3 tag format transmitted by a broadcast station of digital radio broadcast. As shown in FIG. 11, the ID3 tag is configured to include information of "name of artist" 28, "title" 30, "genre" 32, and "comment" 34. The ID3 tag is typically generated by the broadcast station to introduce the content currently being broadcast, and transmitted in addition to the audio signal. The digital signal decoding unit 22 of the radio broadcast receiving apparatus 10 of the related art decodes the broadcast signal received by the reception unit 14 to decode various information contained in the ID3 tag. The text information decoded by the digital signal decoding unit 22 is thereafter transferred to the display unit 24.

The display unit 24 is a display device for displaying the text information transferred from the digital signal decoding unit 22, and may be a CRT (Cathode Ray Tube), a liquid crystal display device, an organic EL (Electro Luminescence) display device or the like. The display unit 24 can display the content information decoded by the digital signal decoding unit 22 such as the name of artist, title, and genre. The user can then visually recognize the information on the content being broadcast by the broadcast station which is currently being received by the reception unit 14 from the content information displayed on the display unit 24.

FIG. 12 is an explanatory view showing a display example of the display unit 24. As shown in FIG. 12, the display unit 24 displays information related to music currently being received by the radio broadcast receiving apparatus 10. As described above, the digital signal decoding unit 22 decodes the broadcast signal transmitted from the broadcast station to decode the content information contained in the ID3 tag. The display unit 24 can then display the content information being broadcast by the broadcast station. In the example shown in FIG. 12, the display unit 24 displays the station name "Channel 1", the name of the artist "Utaya Hikaru", title "Prisoner On Love", genre "J-POP", and comment "Welcome to Channel 1". The user can then visually recognize the information related to the content being broadcast by the broadcast station "Channel 1", which is currently being received by the radio broadcast receiving apparatus 10.

However, the radio broadcast receiving apparatus 10 of the related art configured as above can only display the information on the content being currently received. In other words, in order to display content information of another broadcast station, a reception unit 14 needs to detect the broadcast signal of a frequency corresponding to the another broadcast station, and the digital signal decoding unit 22 needs to decode the content information from the broadcast signal. Therefore, the user may not recognize the content information being broadcast by another broadcast station unless the user once switches the broadcast station the user is currently listening to another station. In the example shown in FIG. 12, the user is not able to recognize what content is being broadcast in another channel (broadcast station) unless the user changes the channel from "Channel 1".

The present invention addresses such issues of the radio broadcast receiving apparatus 10 of the related art. A radio broadcast receiving apparatus according to each embodiment of the present invention will be described below.

(2. First Embodiment)

The radio broadcast receiving apparatus 10 of the related art can only display the content information of the broadcast station which is currently being received. A radio broadcast receiving apparatus 100 according to a first embodiment of the present invention, in contrast, receives broadcast signals from a plurality of broadcast stations in a state in which the power is not turned on (hereinafter referred to as system OFF), and extracts content information from text information added to the broadcast signals. The content information from each broadcast station extracted in such a manner is stored and managed to thereby generate an electronic program guide (hereinafter referred to as EPG) showing the content information related to the contents currently being broadcast by the broadcast stations. The radio broadcast receiving apparatus 100 according to the first embodiment thus can display the EPG showing the content information of a plurality of broadcast stations which can be currently received by the radio broadcast receiving apparatus 100. The radio broadcast receiving apparatus 100 according to the first embodiment having such features will be described below.

(2-1. Functional Configuration of Radio Broadcast Receiving Apparatus 100)

First, the functional configuration of the radio broadcast receiving apparatus 100 according to the first embodiment of the present invention will be described. FIG. 1 is a function block diagram showing the functional configuration of the radio broadcast receiving apparatus 100 according to the first embodiment.

As shown in FIG. 1, the radio broadcast receiving apparatus 100 is configured to mainly include a reception unit 102, an audio decoding unit 16, an amplifier 18, an audio output unit 20, a digital signal decoding unit 104, a display unit 106, and a control unit 116. The components of the radio broadcast receiving apparatus 100 according to the first embodiment will be described below. The antenna 10, the audio decoding unit 16, the amplifier 18, and the audio output unit 20 are similar to the radio broadcast receiving apparatus 10 of the related art described above, and thus the detailed description thereof will not be repeated, and the description will be focused on the control unit, which is a characteristic part of the present embodiment.

As shown in FIG. 1, the control unit 116 is configured to mainly include a frequency control unit 108, a content information extracting unit 110, a storage unit 112, and an EPG generating unit 114.

The frequency control unit 108 periodically switches the frequency to be detected by the reception unit 102 from the broadcast signals of the broadcast stations received by the antenna 12. As described above, the radio broadcast receiving apparatus 100 according to the first embodiment is characterized in collecting the content information of each broadcast station in the system OFF state and generating the EPG. Therefore, the frequency control unit 108 periodically switches the frequency to be received by the reception unit 102 through the antenna 12 only during system OFF. The reception unit 102 thus can receive the broadcast signal of a frequency periodically switched by the frequency control unit 108 through the antenna 12 in the system OFF state. The broadcast signal received by the reception unit 102 is thereafter transferred to the digital signal decoding unit 104. The radio broadcast receiving apparatus 100 then can acquire the content information from the broadcast signal received by the reception unit 102, similarly to the radio broadcast receiving apparatus 10 of the related art.

The content information extracting unit 110 extracts information necessary for generating the EPG from the content information decoded by the digital signal decoding unit 104 and stores the extracted information in the storage unit 112. As described above, the text information in ID3 tag format containing information related to the details of the broadcasting content is transmitted from each broadcast station. For instance, if the broadcast station is broadcasting music, the content information extracting unit 110 can extract "name of artist", "title", "genre", and "comment" from the text information in ID3 tag format shown in FIG. 12. The information extracted by the content information extracting unit 110 is not limited thereto, but may be arbitrarily changed or edited. In other words, only "name of artist" and "title" may be extracted, and content information other than the information shown in FIG. 12 may be extracted if the broadcast station attaches information other than the examples shown in FIG. 12.

As described above, when the radio broadcast receiving apparatus 100 is in the system OFF state, the frequency to be detected by the reception unit 102 is periodically switched by the frequency control unit 108. Therefore, the reception unit 102 periodically receives the text information from the broadcast stations corresponding to different frequencies. That is, the content information extracting unit 110 can sequentially extract the content information of a plurality of broadcast stations based on the text information from different broadcast stations received by the reception unit 102. In other words, the content information extracting unit 110 can periodically extract the content information from the text information transmitted by each broadcast station and store the extracted content information in the storage unit 112 while the radio broadcast receiving apparatus 100 is in the system OFF state.

The storage unit 112 is a memory for storing the content information extracted by the content information extracting unit 110. As described above, the content information extracting unit 110 extracts the content information from the text information of each broadcast station received by the reception unit 102 through the antenna 12, and sequentially stores the extracted content information in the storage unit 112. Therefore, when the radio broadcast receiving apparatus 100 is in the system OFF state, the storage unit 112 stores the content information related to the contents currently being broadcast by a plurality of broadcast stations which can be received by the radio broadcast receiving apparatus 100.

The EPG generating unit 114 is an electronic program guide generating unit for generating the EPG based on the content information stored in the storage unit 112. As described above, the storage unit 112 stores the content information related to the contents currently being broadcast by the broadcast stations which can be received by the radio broadcast receiving apparatus 100. Therefore, the EPG generating unit 114 generates the EPG showing the details of the contents which can be currently received by the radio broadcast receiving apparatus 100 based on such content information. As described above, while the radio broadcast receiving apparatus 100 is in the system OFF state, the content information extracting unit 110 periodically extracts the content information of each broadcast station, and stores the extracted content information in the storage unit 112. Therefore, the EPG generating unit 114 generates the latest EPG every time the content information stored in the storage unit 112 is updated. Thus, when the user turns on the power of the radio broadcast receiving apparatus 100 (hereinafter referred to as system ON) through the operation input unit or the like, the display unit 106 can display the latest EPG generated by the EPG generating unit 114.

FIG. 2 is an explanatory view showing an example in which the display unit 106 displays the latest EPG generated by the EPG generating unit 114 when the radio broadcast receiving apparatus 100 is in the system ON state.

As shown in FIG. 2, the display unit 106 displays the content information of the broadcast station of the frequency currently being received by the reception unit 102 through the antenna 12 on a selected station information display field 118. In the example shown in FIG. 2, the broadcast station "Channel 1" the user is currently listening to, the name of the artist "Utaya Hikaru" of the music, the title "Prisoner On Love", the genre "J-POP", and the comment "Welcome to Channel 1" are displayed. The user can thus visually recognize the information related to the music the user is currently listening to.

The display unit 106 of the radio broadcast receiving apparatus 100 according to the first embodiment further displays the latest EPG generated by the EPG generating unit 114 on an other station information display field 120. In the example shown in FIG. 2, the content information related to the contents currently being broadcast by the broadcast stations "Channels 2 to 6" which can be received by the radio broadcast receiving apparatus 100 are displayed on the other station information display field 120. The user can thus visually recognize not only the information of the content the user is currently listening to but also the content information of other broadcast stations that can be currently selected. The user can also select an arbitrary broadcast station based on the EPG displayed by the display unit 106 to listen to a desired content.

(2-2. EPG Generation Flow)

Figure 3:
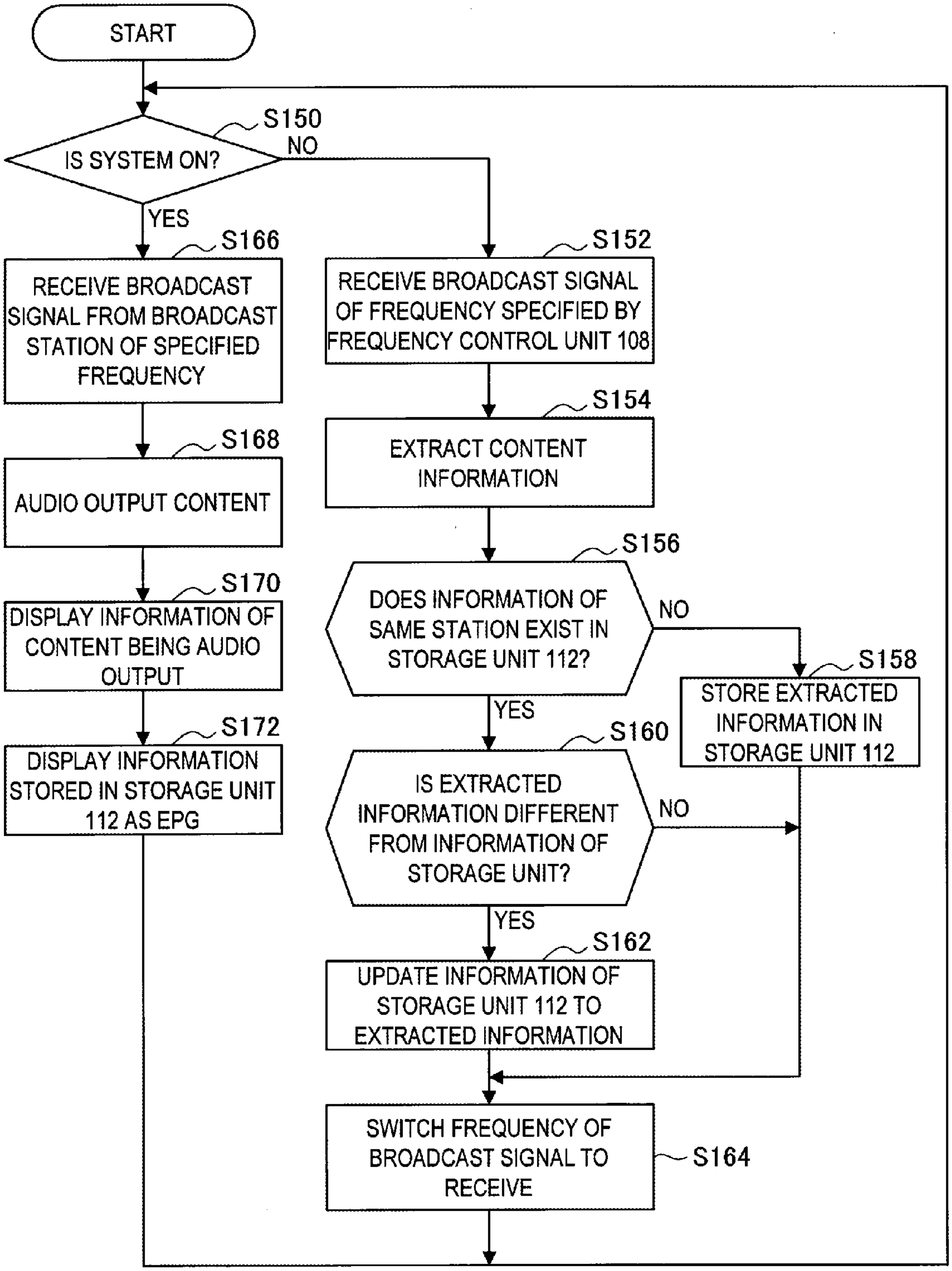
FIG. 3 is a flowchart showing a flow of EPG generation of the radio broadcast receiving apparatus 100 according to the first embodiment.

The flow of the EPG generation by the radio broadcast receiving apparatus 100 according to the first embodiment based on the text information transmitted from each broadcast station will be described with reference to FIG. 3. FIG. 3 is a flowchart showing a flow of the EPG generation by the radio broadcast receiving apparatus 100 according to the first embodiment based on the text information transmitted from each broadcast station. In this specification, the steps described in the flowchart include, in addition to the processes performed in time-series along the described order, processes that may not be processed in time-series but performed in parallel or individually. It is appreciated that the order of steps processed in time-series may be appropriately rearranged in some cases.

As shown in FIG. 3, the radio broadcast receiving apparatus 100 determines whether or not the power of the radio broadcast receiving apparatus 100 is turned on in step 150. As described above, the radio broadcast receiving apparatus 100 according to the first embodiment generates the EPG in the system OFF state.

If system OFF in step 150, the reception unit 102 receives the broadcast signal of the frequency specified by the frequency control unit 108 via the antenna 12 in step 152. The text information contained in the received broadcast signal is thereafter decoded by the digital signal decoding unit 104. In step 154, the content information extracting unit 110 extracts the content information necessary for generating the EPG from the decoded text information.

Figure 4:
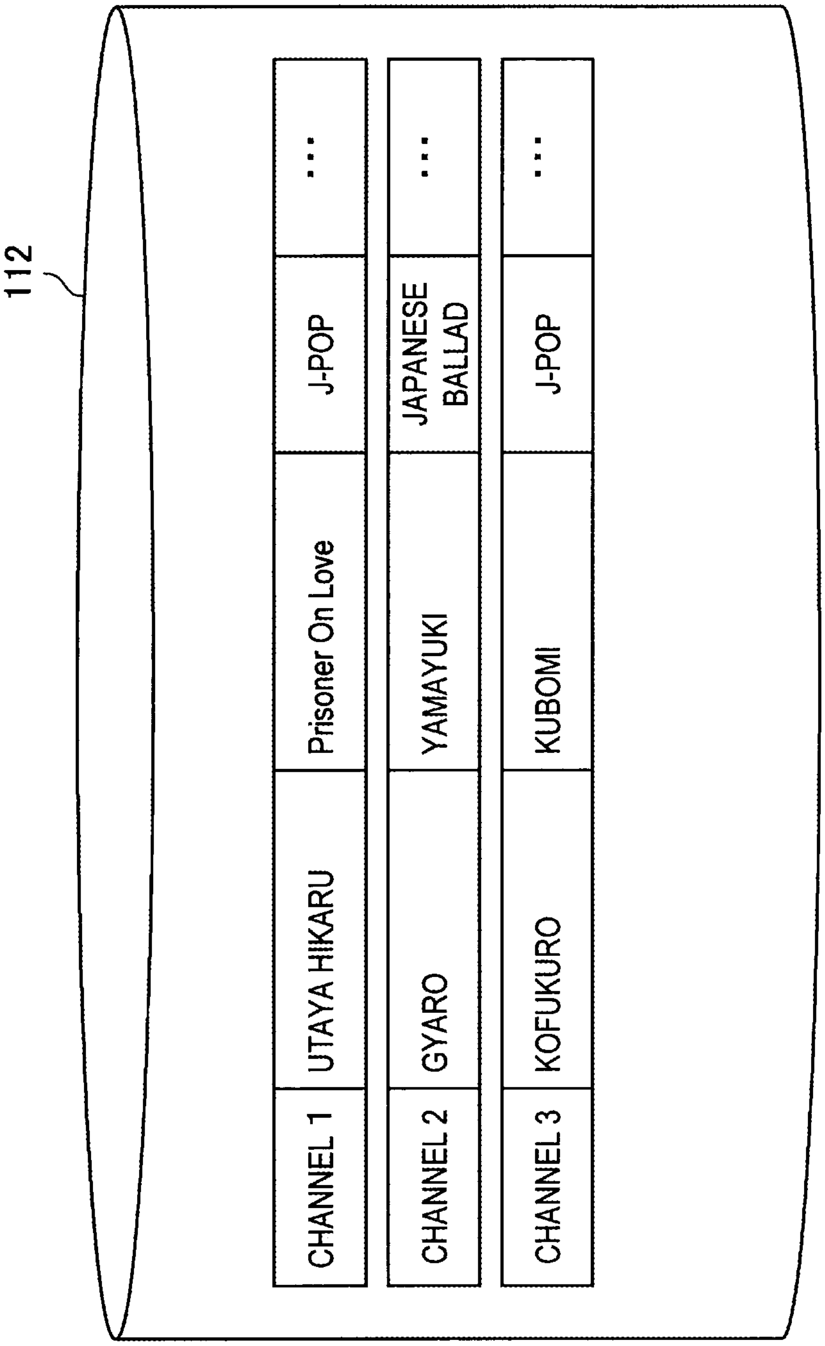
FIG. 4 is a conceptual view of the storage unit 112 storing the content information in the radio broadcast receiving apparatus 100 according to the first embodiment.
Figure 5:
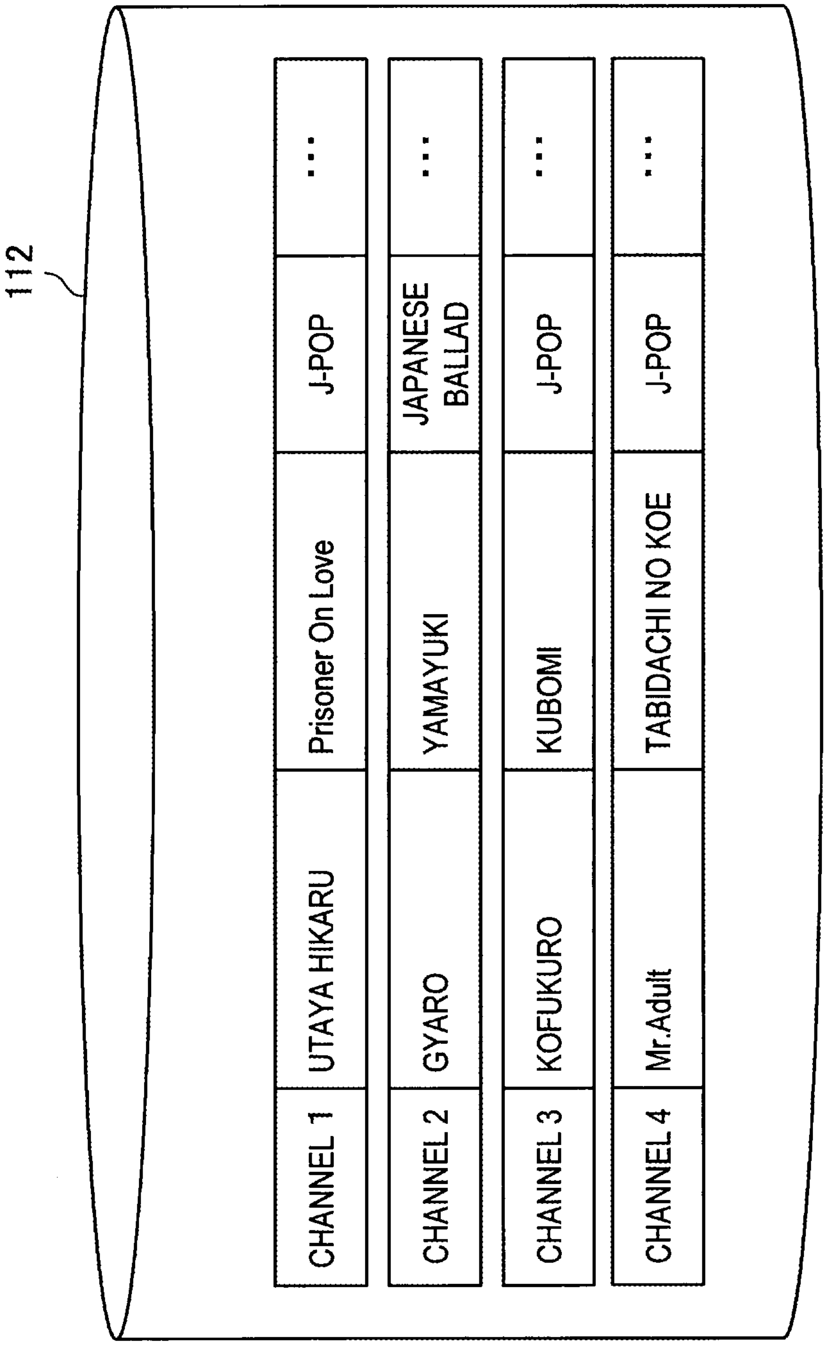
FIG. 5 is a conceptual view of the storage unit 112 in which the content information is added in the radio broadcast receiving apparatus 100 according to the first embodiment.

In step 156, the content information extracting unit 110 then determines whether or not the content information of the same broadcast station as the extracted content information is already stored in the storage unit 112. If determined that the content information of the same broadcast station is not stored in the storage unit 112, the content information extracting unit 110 stores the extracted content information in the storage unit 112 in step 158. FIG. 4 is a conceptual view showing the storage unit 112 storing the content information. As shown in FIG. 4, the storage unit 112 stores the content information extracted by the content information extracting unit 110 for every broadcast station received by the reception unit 102. In the example shown in FIG. 4, the storage unit 112 is stored with the content information of three broadcast stations "Channels 1 to 3". If the content information extracted by the content information extracting unit 110 in step 154 is the content information of the broadcast station "Channel 4", for example, the content information of "Channel 4" is stored in the storage unit 112, as shown in FIG. 5, in step 158. The content information extracting unit 110 can then extract the content information of the broadcast stations that can be currently received by the radio broadcast receiving apparatus 100 and store the extracted information in the storage unit 112 even when a new broadcast station is added, when the radio broadcast receiving apparatus 100 is moved to another region, or the like.

Figure 6:
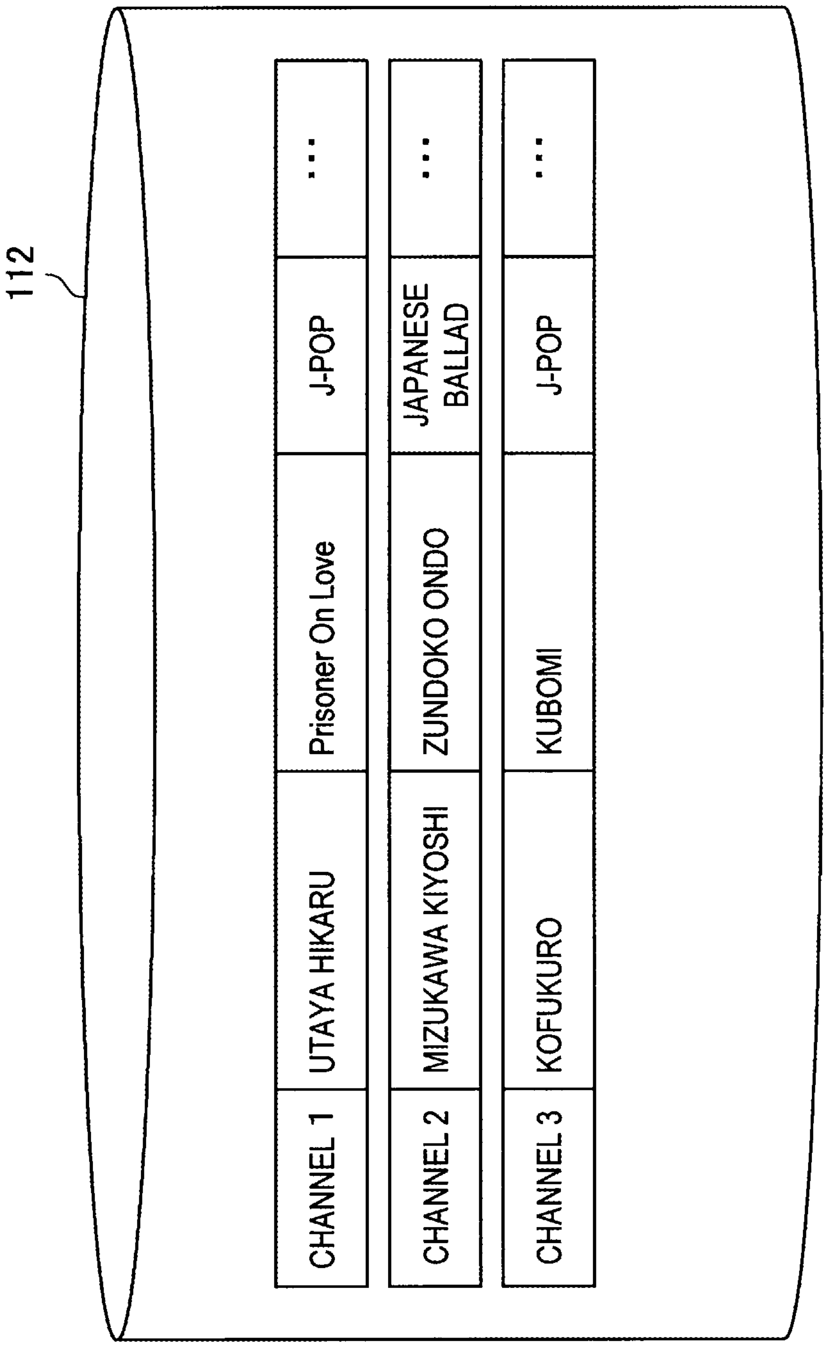
FIG. 6 is a conceptual view of the storage unit 112 in which the content information is updated in the radio broadcast receiving apparatus 100 according to the first embodiment.

On the other hand, if determined that the content information of the same broadcast station is stored in the storage unit 112, the content information extracting unit 110 determines whether or not the extracted content information differs from the content information of the same broadcast station stored in the storage unit 112 in step 160. The broadcast station transmits the same text information while broadcasting the same music, for example. Therefore, if the content information extracted by the content information extracting unit 110 is already stored in the storage unit 112, the content information extracting unit 110 proceeds to step 164 without storing the extracted content information in the storage unit 112. On the other hand, if the content information extracted by the content information extracting unit 110 differs from the content information of the same broadcast station stored in the storage unit 112, the content information extracting unit 110 updates the content information of the same broadcast station stored in the storage unit 112 to the newly extracted content information. FIG. 6 is a conceptual view of the storage unit 112 when the content information is updated by the content information extracting unit 110. The storage unit 112 shown in FIG. 4 stores information such as "Gyaro" for the name of artist, "Yamayuki" for the title, "Japanese ballad" for the genre and the like as the content information of "Channel 2". When the content information extracting unit 110 extracts different content information of the "Channel 2" which is the same broadcast station, the content information extracting unit 110 updates the content information of "Channel 2", as shown in FIG. 6. Specifically, in the example shown in FIG. 6, it can be recognized that the content information of "Channel 2" is updated to "Mizukawa Kiyoshi" for the name of artist and "Zundoko Ondo" for the title. This means that the broadcast station "Channel 2" switched the broadcasting music from the title "Yamayuki" of the name of artist "Gyaro" to the title "Zundoko Ondo" of the name of artist "Mizukawa Kiyoshi". Thus, the storage unit 112 is stored with the content information related to the contents currently being broadcast by the respective broadcast stations.

In step 164, the frequency control unit 108 switches the frequency of the broadcast station to be received by the reception unit 102 via the antenna 12. The frequency control unit 108 can sequentially switch the frequencies of the plurality of broadcast stations set in advance. Alternatively, the frequency control unit 108 may automatically detect the frequencies of the broadcast stations which can be currently received by the radio broadcast receiving apparatus 100, and sequentially switch the detected frequencies.

Thereafter, the radio broadcast receiving apparatus 100 repeats steps 152 to 164 until it is turned to the system ON state. Thus, the radio broadcast receiving apparatus 100 can always extract and manage the content information of each receivable broadcast station in the system OFF state.

If the power of the radio broadcast receiving apparatus is turned on by the user in step 150, the radio broadcast receiving apparatus 100 proceeds to step 166.

First, in step 166, the reception unit 102 receives the broadcast signal of a predetermined frequency via the antenna 12. In this case, the reception unit 102 may receive the broadcast signal of the frequency specified by the user or may receive the broadcast signal of the frequency corresponding to the broadcast station specified by the user.

In step 168, the radio broadcast receiving apparatus 100 outputs the broadcast signal as audio sounds via the audio decoding unit 16, the amplifier 18, and the audio output unit 20. The user is then able to listen to the content being provided by the specified broadcast station. In step 170, the display unit displays the content information of the content the user is currently listening to. The user is thus able to visually recognize the content information of the content the user is currently listening to such as the name of artist, title, genre, and the like.

In step 172, the display unit 106 displays the EPG generated by the EPG generating unit 114 based on the content information stored in the storage unit 112. The user is thus able to visually recognize not only the content information of the content the user is currently listening to, but also the content information of the contents currently being broadcast by other broadcast stations.

Thereafter, when the radio broadcast receiving apparatus is turned to the system OFF state, the radio broadcast receiving apparatus 100 periodically updates the content information of the storage unit 112 again through steps 152 to and generates the latest EPG information.

As described above, the radio broadcast receiving apparatus 100 according to the first embodiment can sequentially switch the frequency to be received by the reception unit 102 via the antenna 12 by the frequency control unit 108 when the radio broadcast receiving apparatus 100 is in the system OFF state. The radio broadcast receiving apparatus 100 can then extract the content information related to the content currently being broadcast by each broadcast station based on the text information transmitted from each broadcast station. The radio broadcast receiving apparatus 100 can also generate the EPG showing the contents currently being broadcast by a plurality of broadcast stations which can be received by the radio broadcast receiving apparatus 100 by storing the extracted content information of each broadcast station in the storage unit 112. Moreover, when the radio broadcast receiving apparatus 100 is turned to the system ON state, the radio broadcast receiving apparatus 100 can display the EPG generated based not only on the content information of the broadcast station currently being received by the reception unit 102 via the antenna 12 but also on the content information of other broadcast stations stored in the storage unit 112. As a result, the user can recognize the content information of the contents currently being broadcast by other broadcast stations without switching the channel the user is currently listening to. In other words, the radio broadcast receiving apparatus 100 according to the present embodiment can generate the latest electronic program guide showing the content information related to the contents currently being broadcast by the plurality of receivable broadcast stations.

(3. Second Embodiment)

The radio broadcast receiving apparatus 100 according to the first embodiment extracts the content information of each broadcast station in the system OFF state and generates the EPG. Therefore, when the user requests for system ON of the radio broadcast receiving apparatus 100 through the operation input unit, the user can see the content information of the contents being broadcast by the broadcast stations as the EPG at the time of the system ON request. However, if time has elapsed since the request for system ON, the details of the content being broadcast by other broadcast stations may be different from those at the time when the system ON request is made. In this case, the radio broadcast receiving apparatus 100 according to the first embodiment may not be able to acquire the content information of other broadcast stations since the reception unit 102 detects only the frequency of the broadcast station the user is currently listening to via the antenna 12. Consequently, the radio broadcast receiving apparatus 100 according to the first embodiment can display the latest EPG of each broadcast station when the system ON request is made, but may not be able to display the latest EPG when a certain time has elapsed since it is turned to system ON. A radio broadcast receiving apparatus according to a second embodiment that addresses such aspect will be described below.

A radio broadcast receiving apparatus 200 according to the second embodiment is characterized in being able to extract the latest content information of other broadcast stations even in the system ON state. In other words, the radio broadcast receiving apparatus 200 according to the second embodiment can sequentially extract the content information of other broadcast stations, and generate and display the latest EPG even when the user is listening to the content of a specific broadcast station. The functional configuration of the radio broadcast receiving apparatus 200 according to the second embodiment will be described below.

(3-1. Functional Configuration of Radio Broadcast Receiving Apparatus 200)

Figure 7:
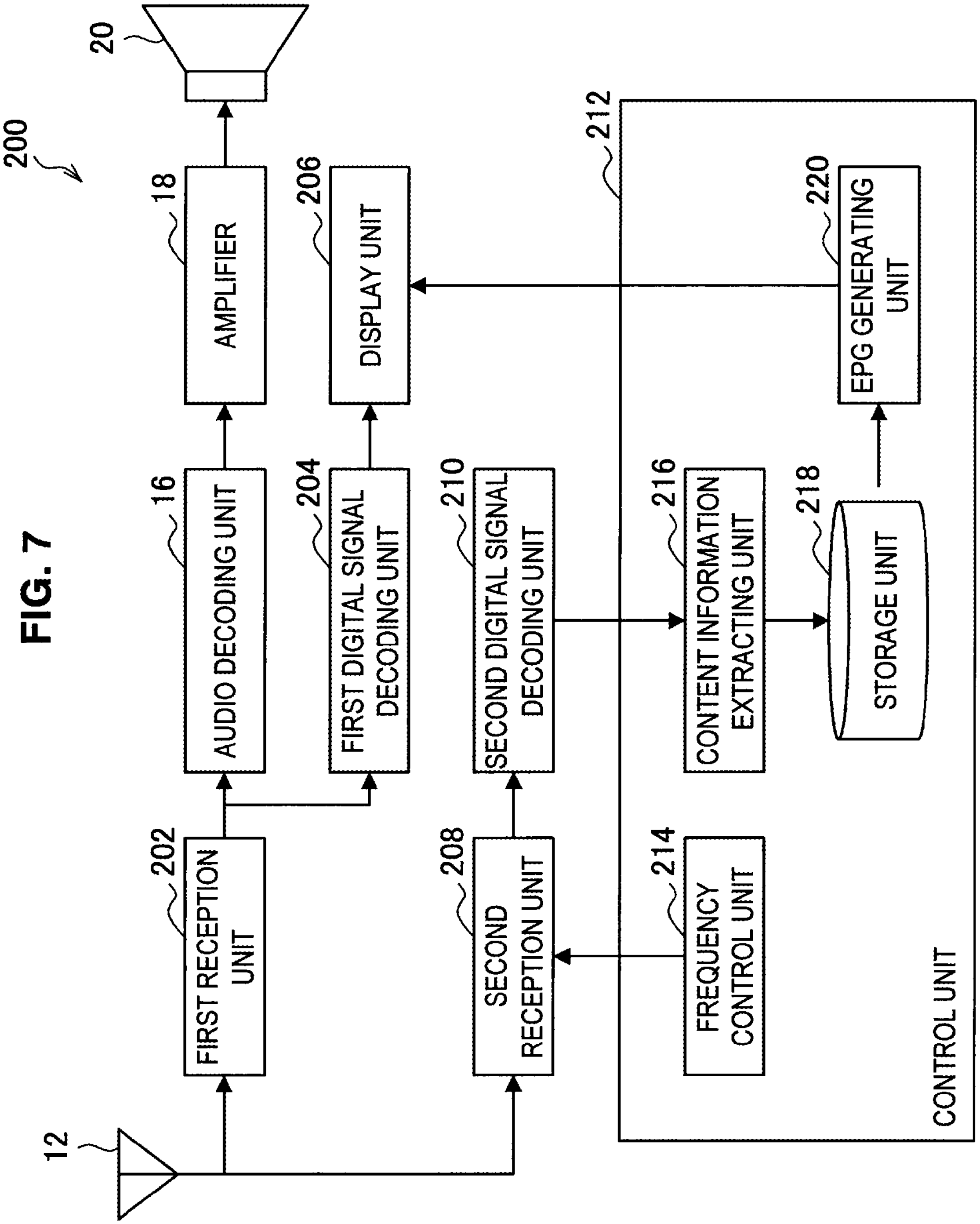
FIG. 7 is a function block diagram showing a functional configuration of a radio broadcast receiving apparatus 200 according to a second embodiment of the present invention.

First, the functional configuration of the radio broadcast receiving apparatus 200 according to the second embodiment of the present invention will be described. FIG. 7 is a function block diagram showing the functional configuration of the radio broadcast receiving apparatus 200 according to the second embodiment.

As shown in FIG. 7, the radio broadcast receiving apparatus 200 is configured to mainly include the antenna 12, a first reception unit 202, the audio decoding unit 16, the amplifier 18, the audio output unit 20, a first digital signal decoding unit 204, a display unit 206, a second reception unit 208, a second digital signal decoding unit 210, and a control unit 212. The components of the radio broadcast receiving apparatus 200 according to the second embodiment will be described below. The antenna 12, the audio decoding unit 16, the amplifier 18, and the audio output unit 20 are similar to the radio broadcast receiving apparatus 10 of the related art described above, and thus the detailed description thereof will not be repeated.

The radio broadcast receiving apparatus 200 additionally includes the second reception unit 208 and the second digital decoding unit 210 as compared to the radio broadcast receiving apparatus 100 according to the first embodiment. The radio broadcast receiving apparatus 200 according to the second embodiment can extract the content information of the respective broadcast stations even in the system ON state by including the second reception unit 208 and the second digital signal decoding unit 210.

The second reception unit 208 periodically detects the broadcast signal of the frequency of each broadcast station via the antenna 12 regardless of the activation state of the radio broadcast receiving apparatus 200. Specifically, when the radio broadcast receiving apparatus 200 is in the system OFF state, the second reception unit 208 detects the broadcast signal transmitted from the broadcast station of the frequency specified by the frequency control unit 214, similarly to the reception unit 102 of the radio broadcast receiving apparatus 100 according to the first embodiment. Thereafter, the detected broadcast signal is transferred to the second digital signal decoding unit 210, where the text information in ID3 tag format or the like is decoded. Furthermore, similarly to the radio broadcast receiving apparatus 100 according to the first embodiment, the content information is extracted and stored, and the EPG is generated by the control unit 212. The radio broadcast receiving apparatus 200 can then display the EPG generated based on the latest content information of each broadcast station when the request for system ON is made by the user.

The radio broadcast receiving apparatus 200 according to the second embodiment is characterized in including two reception units, that is, the first reception unit 202 and the second reception unit 208. Thus, when the user requests for system ON of the radio broadcast receiving apparatus 200 through the operation input unit, the first reception unit 202 detect the broadcast signal of the frequency specified by the user in the radio broadcast receiving apparatus 200. Furthermore, similarly to the radio broadcast receiving apparatus 10 of the related art, the radio broadcast receiving apparatus 200 outputs the content as audio sounds via the audio decoding unit 16, the amplifier 18, and the audio output unit 20. The radio broadcast receiving apparatus 200 also displays the content information related to the content currently being output as audio sounds on the display unit 206 based on the text information decoded by the first digital signal decoding unit 204. The user can then listen to the content of the specified broadcast station and visually recognize the information on the content the user is currently listening to by the content information displayed on the display unit 206.

Furthermore, the second reception unit 208 periodically detects the broadcast signals of other broadcast stations via the antenna 12 even when the radio broadcast receiving apparatus 200 is in the system ON state. Regarding the broadcast signals of other broadcast stations received by the second reception unit 208, as described above, the content information is extracted therefrom and stored by the second digital signal decoding unit 210 and the control unit 212 to generate the latest EPG. In other words, the first reception unit 202 detects the broadcast signal of the broadcast station specified by the user, and at the same time, the second reception unit 208 sequentially detects the broadcast signals of other broadcast stations. Therefore, the radio broadcast receiving apparatus 200 can extract the content information of other broadcast stations, and generate the latest EPG even while the user is listening to the content of a specific broadcast station.

For instance, in the example shown in FIG. 2, the user is currently listening to the content of the broadcast station "Channel 1", and the display unit 206 is displaying the EPG generated based on the content information of other broadcast stations. In this case, when a certain time has elapsed and the content broadcast in another broadcast station is changed, the EPG displayed on the display unit 206 is also updated. FIG. 8 is an explanatory view showing a display example of the display unit 206 when the EPG is updated while the user is listening to the broadcast station "Channel 1".

In the EPG shown in FIG. 2, the broadcast station "Channel 3" is broadcasting the music whose name of artist is "Kofukuro", but is broadcasting the music whose name of artist is "TUN-KAT" in the example shown in FIG. 8. Similarly, the broadcast station "Channel 5" is broadcasting the music whose name of artist is "C'z" and the comment "C'z scheduled to appear as guest performer" is displayed in the EPG shown in FIG. 2, but the comment is updated to "C'z appearing as guest performer" in the example shown in FIG. 8. Thus, the user can recognize the content information of the contents currently being broadcast by other broadcast station while listening to the broadcast station "Channel 1". As a result, the user can visually recognize what contents are currently being broadcast by other broadcast stations without switching the channel. In other words, the radio broadcast receiving apparatus 200 according to the second embodiment can generate the latest EPG and provide the same to the user by extracting the content information related to the contents currently being broadcast by the receivable broadcast stations regardless of the activation state of the system.

(3-2. EPG Generation Flow)

Figure 9:
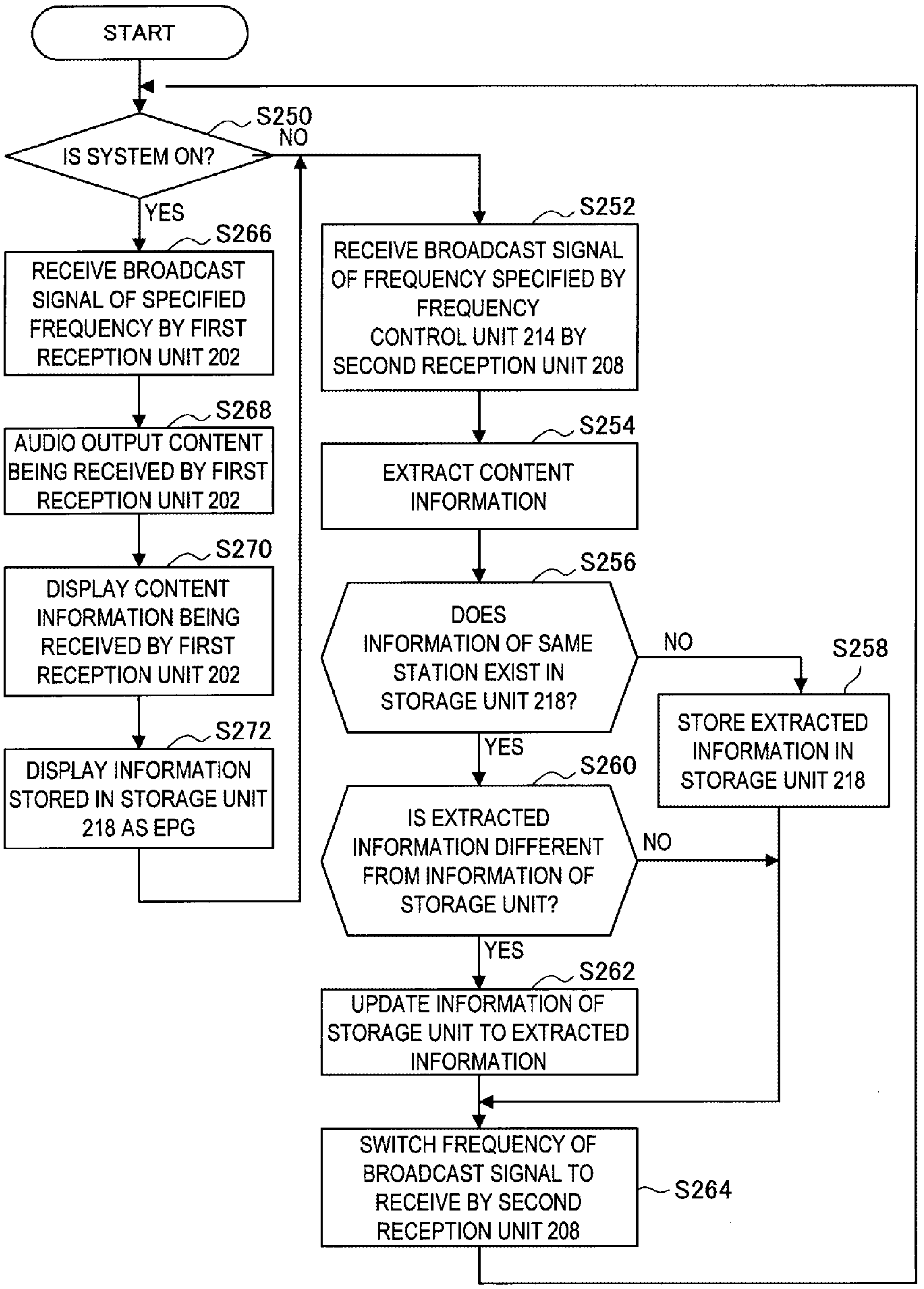
FIG. 9 is a flowchart showing a flow of EPG generation of the radio broadcast receiving apparatus 200 according to the second embodiment.

The flow of the EPG generation by the radio broadcast receiving apparatus 200 according to the second embodiment based on the text information transmitted from each broadcast station will be described with reference to FIG. 9. FIG. 9 is a flowchart showing a flow of the EPG generation by the radio broadcast receiving apparatus 200 according to the second embodiment based on the text information transmitted from each broadcast station.

As shown in FIG. 9, the radio broadcast receiving apparatus 200 determines whether or not the radio broadcast receiving apparatus 200 is in the system ON state in step 250. This is because the first reception unit 202 receives the broadcast signal of the frequency of the broadcast station specified by the user only when the radio broadcast receiving apparatus 200 is in the system ON state, as described above.

If not system ON in step 250, the second reception unit 208 receives the broadcast signal of the frequency specified by the frequency control unit 214 via the antenna 12 in step 252. Thereafter, the text information contained in the received broadcast signal is decoded by the second digital signal decoding unit 214. The content information extracting unit 216 extracts the content information necessary for generating the EPG from the decoded text information in step 254.

Similarly to the radio broadcast receiving apparatus 100 according to the first embodiment described above, the content information extracting unit 216 stores the latest content information of each broadcast station in the storage unit 218 in steps 256 to 262.

In step 264, the frequency control unit 214 switches the frequencies of the broadcast stations to be received by the second reception unit 208 via the antenna 12. For example, the frequency control unit 214 may sequentially switch the frequencies of the plurality of broadcast stations set in advance, or may automatically detect the frequencies of the broadcast stations which can be currently received by the radio broadcast receiving apparatus 200, and sequentially switch the detected frequencies.

Thereafter, the radio broadcast receiving apparatus 200 repeats steps 252 to 264 until it is turned to the system ON state. Thus, the radio broadcast receiving apparatus 200 can always extract and manage the content information of each receivable broadcast station in the system OFF state.

If the user then requests for system ON of the radio broadcast receiving apparatus 200 through the operation input unit in step 250, the process proceeds to step 266.

First, in step 266, the first reception unit 202 receives the broadcast signal of a predetermined frequency via the antenna 12. In this case, the first reception unit 202 may receive the broadcast signal of the frequency specified by the user or may receive the broadcast signal of the frequency corresponding to the broadcast station specified by the user.

In step 268, the radio broadcast receiving apparatus 200 outputs the content of the broadcast station the first reception unit 202 is receiving as audio sounds via the audio decoding unit 16, the amplifier 18, and the audio output unit 20. The user is then able to listen to the content being provided by the specified broadcast station. In step 270, the display unit 206 displays the content information of the content the user is currently listening to. The user is thus able to visually recognize the content information of the content the user is currently listening to such as the name of artist, title, genre, and the like.

In step 272, the display unit 206 displays the EPG generated based on the content information stored in the storage unit 218. The user is thus able to visually recognize not only the content information of the content the user is currently listening to, but also the content information of the contents currently being broadcast by other broadcast stations.

The radio broadcast receiving apparatus 200 according to the second embodiment extracts and manages the latest content information of other broadcast stations through steps 252 to 264 even in the system ON state, that is, even while the user is listening to the content of a specific broadcast station. Therefore, since the content information stored in the storage unit 218 is always the latest content information even in the system ON state, the latest EPG is displayed on the display unit 206 in step 272.

As described above, in the radio broadcast receiving apparatus 200 according to the second embodiment, the frequency control unit 214 can sequentially switch the frequency to be received by the second reception unit 208 via the antenna 12 regardless of the activation state of the system of the radio broadcast receiving apparatus. Thus, the radio broadcast receiving apparatus 200 can extract the content information related to the content currently being broadcast by each broadcast station based on the text information transmitted from each broadcast station regardless of the activation state of the system. The radio broadcast receiving apparatus 200 can also generate the EPG of a plurality of broadcast stations, which are currently receivable by the radio broadcast receiving apparatus 200, regardless of the activation state of the system by storing the extracted content information of each broadcast station in the storage unit 218. Moreover, the radio broadcast receiving apparatus 200 can display the EPG generated based not only on the content information of the broadcast station the first reception unit 202 is receiving via the antenna 12 but also on the content information of other broadcast stations stored in the storage unit 218 in the system ON state. As a result, the user can recognize the information related to the contents currently being broadcast by other broadcast stations without switching from the channel the user is currently listening to. In other words, the radio broadcast receiving apparatus 200 according to the present embodiment can generate the latest electronic program guide showing the content information related to the contents currently being broadcast by a plurality of receivable broadcast stations regardless of the activation state of the system.

In FIG. 9, the processes of steps 266 to 272 performed through the first reception unit 202 in time of system ON and the processes of steps 252 to 264 performed through the second reception unit 208 are described in time-series for the sake of convenience of the explanation, but are not limited thereto. Specifically, the processes of steps 252 to 264 performed through the second reception unit 208 are performed independently of the processes of steps 266 to 272 performed through the first reception unit 202, and it is appreciated that such processes can be performed in parallel.

The present invention contains subject matter related to Japanese Patent Application JP 2008-167489 filed in the Japan Patent Office on Jun. 26, 2008, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

For example, in the above-described embodiments, an example of generating the EPG based on the text information transmitted from the digital broadcast station providing the digital broadcast has been described, but the present invention is not limited to such an example. For instance, the EPG can be generated based on the text information simultaneously transmitted with the broadcast signal in the analog broadcast such as RBDS broadcast.

The content information shown in the figures are examples for describing the embodiments, and is not limited thereto. The text information transmitted by the broadcast station may be arbitrarily set by the broadcast station, and is not limited to name of artist, title, genre, and the like. In other words, the radio broadcast receiving apparatus according to the embodiments of the present invention can generate and display the EPG showing various content information based on the text information set by the broadcast station.

In the embodiments described above, an example of displaying the generated EPG on the display unit in the system ON state has been described, but the present invention is not limited thereto. For example, the latest EPG can be displayed on the display unit even in the system OFF state to invite the user to request for system ON of the radio broadcast receiving apparatus.

The invention claimed is:

1. A radio broadcast receiving apparatus comprising:

a reception unit for receiving a first broadcast signal at a first frequency, wherein the reception unit is capable of receiving signals at a receiving frequency that may be any of a plurality of broadcast frequencies, wherein the plurality of broadcast frequencies comprises the first frequency, wherein the reception unit is capable of receiving a broadcast signal at only one of the plurality of broadcast frequencies at a time;

a digital signal decoding unit for decoding first text information contained in the first broadcast signal;

a content information extracting unit for extracting, from the first text information, first content information related to a first content of the first broadcast signal received by the reception unit, and storing the first content information in a storage unit;

a frequency control unit for periodically switching the receiving frequency to be received by the reception unit only when the radio broadcast receiving apparatus is in an off state; and an electronic program guide generating unit for generating an electronic program guide comprising the first content information related to the first content of the first broadcast signal based on the first content information stored in the storage unit;

wherein the content information extracting unit skips storing of the first content information in the storage unit if the first content information of the first broadcast signal is the same as previously-received content information for the first broadcast signal stored in the storage unit.

2. The radio broadcast receiving apparatus according to claim 1, wherein the reception unit receives a plurality of broadcast signals, each of the plurality of broadcast signals being at an associated frequency of the plurality of broadcast frequencies, based on the receiving frequency switched by the frequency control unit when the radio broadcast receiving apparatus is in the off state; and the reception unit receives a second broadcast signal at a second frequency specified by a user when the radio broadcast receiving apparatus is in an on state.

3. The radio broadcast receiving apparatus according to claim 1, wherein the frequency control unit switches the receiving frequency to be received by the reception unit every time the content information extracting unit extracts content information from a presently received broadcast signal received by the reception unit.

4. The radio broadcast receiving apparatus according to claim 1, wherein the content information extracting unit updates the previously-received content information of the first broadcast signal stored in the storage unit to the first content information if the first content information of the first broadcast signal differs from the previously-received content information of the first broadcast signal stored in the storage unit.

5. The radio broadcast receiving apparatus of claim 2, further comprising:

an audio output unit configured to output audio sounds in response to audio data of the second broadcast signal only when the radio broadcast receiving apparatus is in the on state.

6. The radio broadcast receiving apparatus of claim 5, further comprising:

an audio decoding unit, separate from the digital signal decoding unit, configured to decode the audio data of the second broadcast signal.

7. A radio broadcast receiving apparatus comprising:

a reception unit for receiving a first broadcast signal at a first frequency, wherein the reception unit is capable of receiving signals at a receiving frequency that may be any of a plurality of broadcast frequencies, wherein the plurality of broadcast frequencies comprises the first frequency, wherein the reception unit is capable of receiving a broadcast signal at only one of the plurality of broadcast frequencies at a time;

a digital signal decoding unit for decoding first text information contained in the first broadcast signal;

a content information extracting unit for extracting, from the first text information, first content information related to a first content of the first broadcast signal received by the reception unit, and storing the first content information in a storage unit;

a frequency control unit for periodically switching the receiving frequency to be received by the reception unit only when the radio broadcast receiving apparatus is in an off state; and an electronic program guide generating unit for generating an electronic program guide comprising the first content information related to the first content of the first broadcast signal based on the first content information stored in the storage unit;

wherein the content information extracting unit skips storing of the first content information in the storage unit if the first content information of the first broadcast signal is the same as previously-received content information for the first broadcast signal stored in the storage unit;

wherein first text information is text information in ID3 tag format contained in the first broadcast signal received by the reception unit.

8. The radio broadcast receiving apparatus according to claim 7, wherein the first content information includes information related to at least a name of an artist, a title, and a genre associated with the content of the first broadcast signal.

9. The radio broadcast receiving apparatus according to claim 8, further comprising a display unit for displaying the electronic program guide generated by the electronic program guide generating unit.

10. A radio broadcast receiving method in a radio broadcast receiving apparatus, the method comprising the acts of:

receiving a first broadcast signal at a first frequency, wherein the radio broadcast receiving apparatus is capable of receiving a broadcast signal at only one frequency of a plurality of frequencies at a time;

decoding text information contained in the first broadcast signal;

extracting, from the text information, content information related to a content of the first broadcast signal received in the receiving act;

storing the content information in a storage unit, except when the content information is the same as previously received content information already stored in the storage unit;

periodically switching a receiving frequency to one of the plurality of broadcast frequencies that may be received by the radio broadcast receiving apparatus only when the radio broadcast receiving apparatus is in an off state; and generating an electronic program guide comprising the content information related to the content the first broadcast signal based on the content information stored in the storage unit in the storing act.

11. The radio broadcast receiving method according to claim 10, wherein the receiving act includes periodically receiving a plurality of broadcast signals, each of the plurality of broadcast signals being at an associated frequency of the plurality of broadcast frequencies, based on the receiving frequency switched in the switching act when the radio broadcast receiving apparatus is in the off state, and receiving a second broadcast signal specified by a user when the radio broadcast receiving apparatus is in an on state.

12. The radio broadcast receiving method of claim 11, further comprising:

outputting audio content of the second broadcast signal to the user only when the radio broadcast receiving apparatus is in the on state.

* * * * *